No. 782,056. PATENTED FEB. 7, 1905.
J. F. RICHARDSON.
METHOD OF BRAZING METALS.
APPLICATION FILED AUG. 1, 1904.

Witnesses:
K. H. Butler
E. E. Potter

Inventor,
J. F. Richardson,
By H. C. Evert & Co.
Attorneys.

No. 782,056.                                             Patented February 7, 1905.

UNITED STATES PATENT OFFICE.

JOHN F. RICHARDSON, OF PITTSBURG, PENNSYLVANIA.

METHOD OF BRAZING METALS.

SPECIFICATION forming part of Letters Patent No. 782,056, dated February 7, 1905.

Application filed August 1, 1904. Serial No. 219,145.

*To all whom it may concern:*

Be it known that I, JOHN F. RICHARDSON, a citizen of the United States of America, residing at Pittsburg, in the county of Allegheny and State of Pennsylvania, have invented certain new and useful Improvements in Methods of Brazing Metals, of which the following is a specification, reference being had therein to the accompanying drawings.

This invention relates to certain new and useful improvements in methods of brazing rails and the like; and the object of the invention is to provide novel means whereby the abutting ends of two rail-sections may be firmly and rigidly brazed together.

Another object of this invention is to provide means whereby the abutting ends of two rail-sections may be held together in such a manner that the confronting faces of each section of rail may be fused to such a degree as to braze the sections together.

My improved method of brazing two rail-sections together is particularly adapted for electric railways, wherein it is necessary that a positive connection should exist between the rail-sections to eliminate leakage of the current which passes therethrough.

The present system of connecting two rail-sections together necessitates considerable apparatus of a special construction, and the rail-sections are generally connected together by a cast-iron jacket which is cast around the adjacent ends of the rail-sections, it being necessary to grind each connection of the rails after the jacket has been cast around the ends of the rail-sections. In my improved method I have entirely dispensed with the cumbersome apparatus heretofore required and have provided novel means whereby the confronting faces of the ends of two sections of rail may be quickly and firmly brazed together, the connection between the rails assuring a positive connection whereby the leakage of the current which passes through the rails is eliminated.

The procedure by which I accomplish the above results will be hereinafter described and then specifically claimed, and reference will be had to the accompanying drawings, wherein I have illustrated the different steps involved in brazing the abutting ends of two rails together.

Throughout the several views of the drawings like numerals of reference designate corresponding parts.

Figure 1:
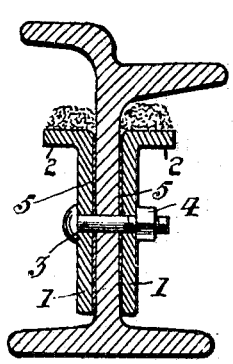
Figure 2:
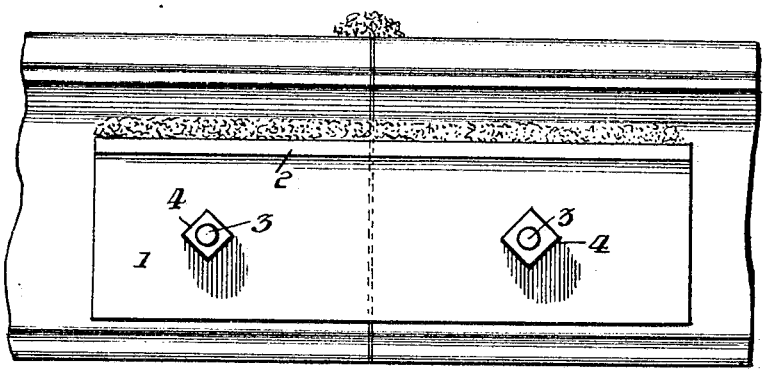
Figure 3:
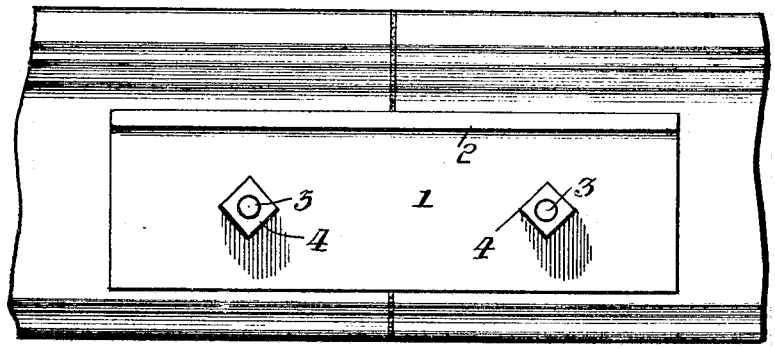

Referring to the drawings, Figure 1 is a vertical sectional view of a section of rail, illustrating one of the steps involved in brazing two rail-sections together. Fig. 2 is a side elevation view of the abutting ends of two rail-sections, showing the same joined together and ready to be brazed; and Fig. 3 is a similar view showing the two rail-sections after they have been brazed.

It is a well-known fact that to thoroughly braze two pieces of metal together some fusible metal must be employed which will adhere to the metal to be brazed together and form a connection between the same. I have found by experiment that brass in the form of sheets or a powder serves this purpose, and I use this fusible metal in brazing two rail-sections together. It is also a well-known fact that the abutting or confronting faces of the metal to be joined together should be cleansed of all ingredients that would be detrimental to the operation of brazing the confronting faces together, and I first cleanse the ends of the rail-sections by filing the ends of the rails, and in case the ends of the rails should be joined in some manner I cleanse the faces of the ends of the rails by passing a saw between the ends of the rails, this saw removing all ingredients that may interfere with the operation of brazing the two sections of rail together.

We will assume that the ends of the rails have not been joined together by any means, in which case I employ two metallic plates 1 1, the upper edges of these plates being bent outwardly, as indicated at 2 2, to form a flange upon which a suitable flux or fusible material may be placed. One of these plates is placed upon each side of the web portion of the ends of the rails and the plates are secured to the web of the rail by bolts 3 3, which pass through the plates and the web portion of the rail and have secured on their threaded ends a nut 4. A bolt and nut are placed upon each end of the rail, whereby each end of the metallic plates 1 1 will be supported upon the web portions of the rail-sections. Prior to securing these plates upon the web portions of the rail-sections I place a thin sheet of brass 5 5 upon each side of the web portions of the rails, and when the plates 1 1 are placed in position this thin sheet of brass will lie between each plate and the sides of the web portion of the rail-sections.

As heretofore stated, I employ brass as a fusing material, and in combination with this brass a suitable flux, such as borax, and besides employing the sheets of brass 5 5 I employ brass of a powdered form and mix the same with borax. The borax and powdered brass are placed upon the flanges formed by the bent-outwardly portions 2 of each plate and a quantity of this flux and powdered brass is placed over the joint formed by the confronting faces of the ends of the rail-sections. The ends of the rails having been so secured together and prepared for brazing, the ends of the rails are then submitted to a high degree of temperature, such as would be provided by a blowpipe and fire. The action of a high degree of heat upon the ends of the rails causes the brass and flux to fuse with the confronting faces of the ends of the rail-sections, also causing the inner faces of the plates 1 1 to become brazed to the web portion of the rails. By so brazing the two ends of the rail-sections together a positive connection is established between the same, whereby it will be impossible for the electric current which passes through the rails to escape therefrom.

The bolts 3 3 are merely employed to hold the ends of the rail-sections together, and after the brazing operation has been performed these bolts, if it be desired, could be removed without impairing the connection between the rail-sections. While I have herein shown the bolt as being employed to hold the ends of the rails together, I wish it to be understood that any other means than this may be employed, also that any suitable flux which would serve the same function as borax may be used.

Having fully described my invention, what I claim, and desire to secure by Letters Patent, is—

1. The herein-described method of securing together the ends of rails which consists in locating plates of steel or iron on each side of the web of the rail, interposing a thin sheet of fusible metal between each of said plates and the side of the rail, said sheets being coextensive with said plates, massing a suitable mixture of flux and finely-divided fusible metal upon the upper edges of said plates and the upper edges of said thin sheets and then subjecting the parts to heat sufficient to melt the finely-divided metal and the plates of fusible metal, substantially as described.

2. The herein-described method of brazing two rail-sections together which consists of securing the rails together by two metallic plates, interposing sheets of brass between said plates and the rail-sections, placing a flux and powdered brass upon said plates and upon the heads of the rails over the joint formed by said rails and then subjecting the ends of the rails to a high degree of heat so as to fuse the rails, the metallic plates and the sheets of brass together, substantially as described.

3. The method of brazing consisting in placing a sheet of fusible metal between two surfaces of non-fusible metal, applying a suitable flux and finely-divided fusible metal and subjecting the whole to a high degree of heat whereby the fusible metal in the finely-divided form and the fusible metal in sheet form will be fused.

4. A method of brazing consisting of interposing brass in solid form between two metals, then applying a suitable flux and brass in a finely-divided condition and fusing the brass in solid form and in finely-divided condition into a single mass.

In testimony whereof I affix my signature in the presence of two witnesses.

JOHN F. RICHARDSON.

Witnesses:
H. C. EVERT,
E. E. POTTER.